United States Patent
Hirota

(10) Patent No.: US 7,036,744 B2
(45) Date of Patent: May 2, 2006

(54) SOLENOID VALVE-EQUIPPED EXPANSION VALVE

(75) Inventor: Hisatoshi Hirota, Tokyo (JP)

(73) Assignee: TGK Co., Ltd., Tokyo (JP)

( * ) Notice: Subject to any disclaimer, the term of this patent is extended or adjusted under 35 U.S.C. 154(b) by 0 days.

(21) Appl. No.: 10/658,551

(22) Filed: Sep. 10, 2003

(65) Prior Publication Data

US 2004/0055318 A1    Mar. 25, 2004

(30) Foreign Application Priority Data

Sep. 25, 2002    (JP)    ............................. 2002-278572

(51) Int. Cl.
*F25B 41/04*    (2006.01)

(52) U.S. Cl. .................. 236/92 B; 62/225; 261/129.15

(58) Field of Classification Search .................. 62/225; 236/92 B; 251/129.15
See application file for complete search history.

(56) References Cited

U.S. PATENT DOCUMENTS

| | | | |
|---|---|---|---|
| 4,646,532 A * | 3/1987 | Nose ........................... | 62/212 |
| 4,953,825 A * | 9/1990 | Osumi et al. ........... | 251/129.17 |
| 5,979,780 A * | 11/1999 | Malone et al. ............ | 236/92 B |
| 6,012,301 A * | 1/2000 | Fujimoto et al. ............. | 62/225 |
| 6,325,296 B1 * | 12/2001 | Dayton ..................... | 236/92 B |
| 6,375,085 B1 * | 4/2002 | Martin et al. ............. | 236/92 B |
| 6,682,046 B1 * | 1/2004 | Mimura et al. ........ | 251/129.15 |
| 6,739,843 B1 * | 5/2004 | Umemura et al. ....... | 417/222.2 |

FOREIGN PATENT DOCUMENTS

| | | |
|---|---|---|
| JP | 10 274453 A | 10/1998 |
| JP | 11-182983 | 7/1999 |
| JP | 11-304298 | 11/1999 |
| JP | 11 304298 A | 11/1999 |

* cited by examiner

*Primary Examiner*—William E Tapolcai
(74) *Attorney, Agent, or Firm*—Westerman, Hattori, Daniels & Adrian, LLP

(57) ABSTRACT

The object of the present invention is to provide a solenoid valve-equipped expansion valve simplified in construction. A common valve element in which a valve element of an expansion valve and a valve element of a stop valve are integrally formed as a unitary member is disposed such that the common valve element can be axially movably guided by a shaft having the driving force of a power element transmitted thereto. A first core of a solenoid, holding the common valve element, is urged by a spring such that the common valve element is seated on a valve seat. When the solenoid is energized, the first core holding the common valve element is attracted by a second core rigidly fixed to the shaft such that the common valve element operates with the shaft in an interlocked fashion. As a result, when the solenoid is deenergized, the common valve element can function as a stop valve, whereas when the solenoid is energized, the common valve element can function as an expansion valve.

2 Claims, 4 Drawing Sheets

SOLENOID VALVE-EQUIPPED EXPANSION VALVE

CROSS-REFERENCES TO RELATED APPLICATIONS, IF ANY

This application claims priority of Japanese Application No.2002-278572 filed on Sep. 25, 2002 and entitled "Solenoid Valve-Equipped Expansion Valve".

BACKGROUND OF THE INVENTION (1) Field of the Invention

This invention relates to a solenoid valve-equipped expansion valve in which a solenoid valve and an expansion valve are integrated with each other, and more particularly to a solenoid valve-equipped expansion valve used in a rear-side circuit of an automotive air-conditioning system which is capable of air-conditioning a front side and a rear side of a vehicle compartment, independently of each other.

(2) Description of the Related Art

Conventionally, as an automotive air-conditioning system, a refrigeration cycle is used in which a front evaporator and an expansion valve associated therewith, and a rear evaporator and an expansion valve associated therewith, are arranged in parallel with each other, so as to make it possible to perform air conditioning control of a front side of a vehicle compartment and that of a rear side of the same independently of each other.

When the front-side refrigeration cycle is being used, the rear-side refrigeration cycle is not necessarily used. Therefore, a solenoid valve serving as a stop valve is provided in a rear-side circuit, and when the rear-side refrigeration cycle is not being used, refrigerant is inhibited from flowing.

In view of installation spaces and costs for installing the stop valve and the expansion valve for the above use, a solenoid valve-equipped expansion valve has been proposed in which the stop valve and the expansion valve are integrated with each other (see e.g. Japanese Unexamined Patent Publication No. 11-182983 (FIG. 2)).

In the solenoid valve-equipped expansion valve of this kind, the integration of the stop valve and the expansion valve is a mere combination thereof in which the function of the stop valve and that of the expansion valve are independent of each other. On the other hand, a solenoid valve-equipped expansion valve has been proposed in which a valve element of the stop valve is configured to be commonly used as a valve element of the expansion valve, thereby making the valve structure compact in size (see e.g. Japanese Unexamined Patent Publication No. 11-304298 (FIG. 1 to FIG. 4)).

However, the above solenoid valve-equipped expansion valve in which the stop valve and the expansion valve have a common valve element is configured to be pilot-operated, which brings about the problem of complicated construction of the valve.

SUMMARY OF THE INVENTION

The present invention has been made in view of the above circumstances, and an object thereof is to provide a solenoid valve-equipped expansion valve simplified in construction.

To solve the above problem, the present invention provides a solenoid valve-equipped expansion valve in which an expansion valve for adiabatically expanding refrigerant and a stop valve for opening and closing a refrigerant passage are integrated with each other, characterized by comprising a driving force-transmitting member inserted into a valve hole of the expansion valve in an urged state such that the driving force-transmitting member is always in abutment with a power element, a common valve element commonly used by the expansion valve and the stop valve, the common valve element being disposed on an opposite side of the valve hole of the expansion valve to the power element, such that the common valve element is axially movable by being guided by the driving force-transmitting member, a spring for urging the common valve element in a valve-closing direction with respect to the driving force-transmitting member, and a solenoid for electromagnetically coupling the common valve element and the driving force-transmitting member with each other when the solenoid is energized, to thereby transmit displacement of the power element to the common valve element.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Hereinafter, embodiments of the present invention will be described in detail with reference to the drawings.

Figure 1:
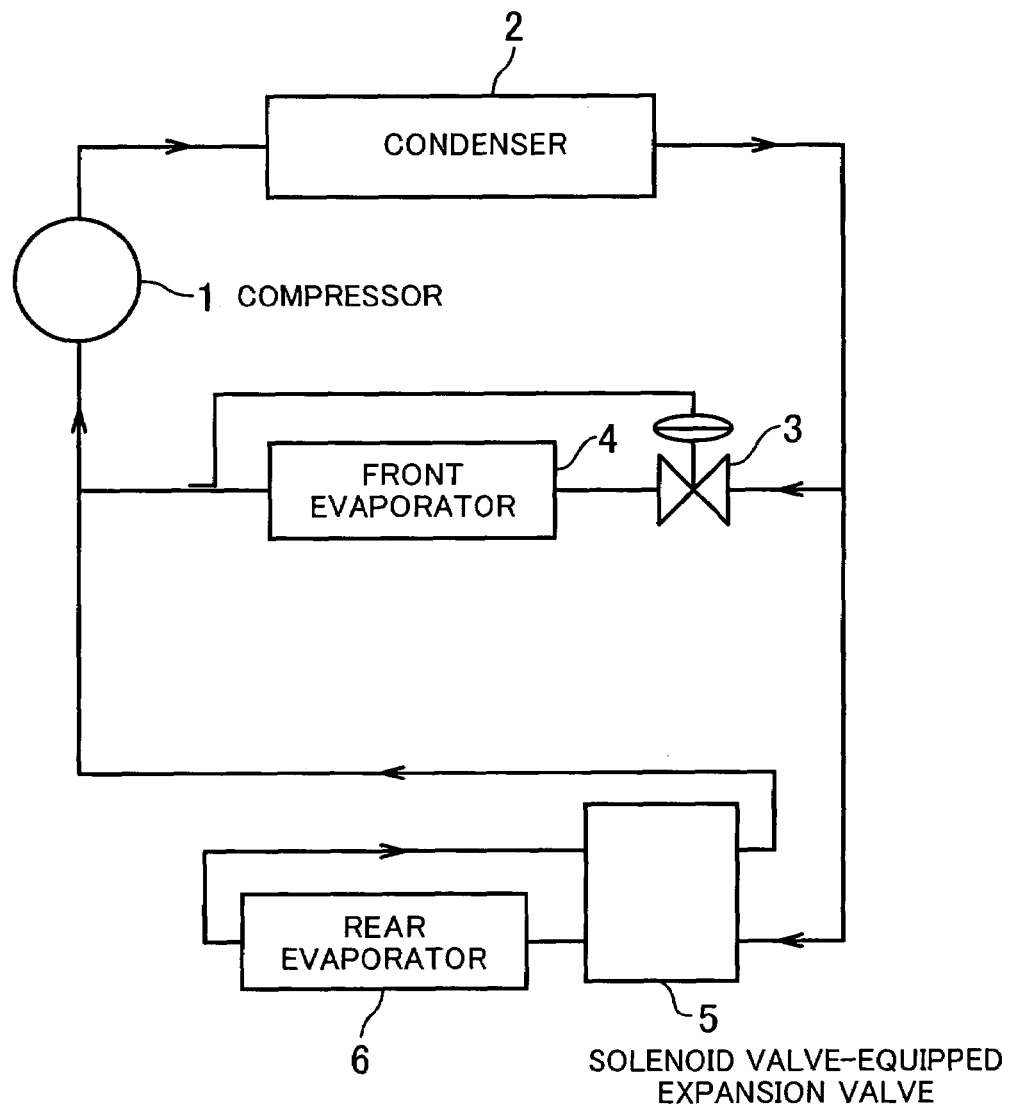
FIG. 1 is a diagram of an automotive air-conditioning system to which is applied a solenoid valve-equipped expansion valve according to the present invention.

FIG. 1 is a diagram of an automotive air-conditioning system to which is applied a solenoid valve-equipped expansion valve according to the present invention.

The automotive air-conditioning system is capable of air-conditioning a front side and a rear side of a vehicle compartment, independently of each other. A compressor 1, a condenser 2, an expansion valve 3, and a front evaporator 4 form a refrigeration cycle of a front-side air conditioning system, while a solenoid valve-equipped expansion valve 5 and a rear evaporator 6, which are connected in parallel with a circuit of the expansion valve 3 and the front evaporator 4, form part of a refrigeration cycle of a rear-side air conditioning system.

High-temperature and high-pressure refrigerant compressed by the compressor 1 is supplied to the condenser 2, where the refrigerant is caused to exchange heat with air outside the compartment, and condensed to liquid refrigerant. This liquid refrigerant is sent to the expansion valve 3 and the solenoid valve-equipped expansion valve 5. The expansion valve 3 causes the liquid refrigerant to undergo adiabatic expansion to be changed into low-temperature and low-pressure refrigerant in a gas-and-liquid-mixed state, and supplies the refrigerant to the front evaporator 4. The front evaporator 4 causes the refrigerant supplied from the expansion valve 3 to exchange heat with air in the front side of the vehicle compartment or air introduced from outside into the compartment to thereby evaporate the refrigerant. The evaporated gaseous refrigerant is returned to the compressor 1. At this time, the expansion valve 3 detects the temperature of the refrigerant at an outlet of the front evaporator 4, and controls the flow rate of the refrigerant such that a predetermined degree of superheat is maintained.

Similarly, in the solenoid valve-equipped expansion valve 5 as well, the liquid refrigerant condensed by the condenser 2 is caused to undergo adiabatic expansion to be changed into low-temperature and low-pressure refrigerant in a gas-and-liquid-mixed state, and supplied to the rear evaporator 6. The rear evaporator 6 causes the refrigerant supplied from the solenoid valve-equipped expansion valve 5 to exchange heat with air in the rear side of the compartment to thereby evaporate the refrigerant. The evaporated gaseous refrigerant passes through the solenoid valve-equipped expansion valve 5 and returns to the compressor 1. At this time, the solenoid valve-equipped expansion valve 5 controls the flow rate of the refrigerant by detecting the temperature and pressure of the refrigerant delivered from the rear evaporator 6.

When the rear-side air conditioning system is not used, the solenoid valve-equipped expansion valve 5 blocks a refrigerant passage in the rear-side air conditioning system so as to inhibit refrigerant from flowing into a rear-side circuit.

Next, a description will be given of an embodiment of the solenoid valve-equipped expansion valve 5.

Figure 2:
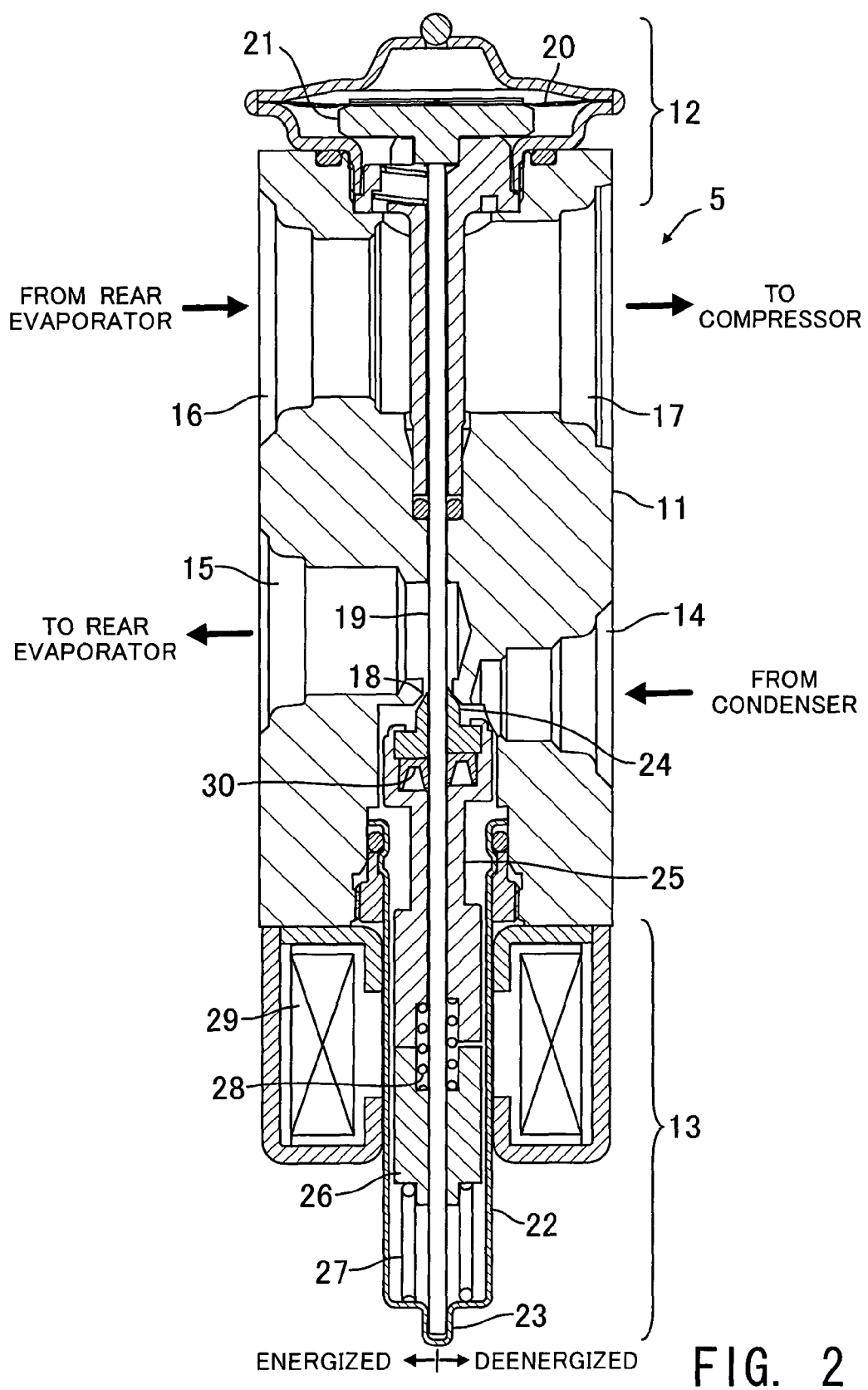
FIG. 2 is a longitudinal cross-sectional view showing an example of the construction of a solenoid valve-equipped expansion valve according to a first embodiment.

FIG. 2 is a longitudinal cross-sectional view showing an example of the construction of a solenoid valve-equipped expansion valve according to a first embodiment of the invention. In FIG. 2, so as to simultaneously show a state in which the solenoid valve-equipped expansion valve is functioning as a stop valve for blocking a refrigerant flow passage, and a state in which the valve is functioning as an ordinary expansion valve whose valve lift is controlled, as far as a valve element and a movable portion of a solenoid are concerned, a right side from the center of the figure shows a valve closed state of the valve in which the solenoid is deenergized, and a left side from the center of the figure shows a state of the same in which the solenoid is energized and the valve is functioning as an expansion valve.

The solenoid valve-equipped expansion valve 5 according to the present invention comprises a body block 11 accommodating the stop valve and a valve portion of the expansion valve, a power element 12 for sensing the temperature and pressure of refrigerant returned from the rear evaporator 6, and a solenoid 13 for switching the solenoid valve-equipped expansion valve 5 between the function of the stop valve and that of the expansion valve.

The body block 11 has side portions formed with a port 14 for receiving high-temperature and high-pressure refrigerant from the condenser 2, a port 15 for supplying low-temperature and low-pressure refrigerant adiabatically expanded by the solenoid valve-equipped expansion valve 5, to the rear evaporator 6, a port 16 for receiving refrigerant returned from the rear evaporator 6, and a port 17 for delivering the refrigerant received by the port 16 to the compressor 1.

A fluid passage communicating between the port 14 and the port 15 has a valve seat 18 integrally formed with the body block 11. A shaft 19 is disposed in a manner extending through a valve hole forming the valve seat 18 in a longitudinal direction of the solenoid valve-equipped expansion valve 5. The shaft 19 has an upper end in abutment with a center disk 21 disposed on an underside surface of a diaphragm 20 of the power element 12, and a lower end supported by a bearing portion 23 formed in a core casing 22 of the solenoid 13.

On an upstream side of the valve seat 18, a common valve element 24 is disposed in a manner opposed to the valve seat 18 such that the common valve element 24 can move to and away from the valve seat 18, using the shaft 19 as a guide, whereby a gap between the valve seat 18 and the common valve element 24 forms a variable orifice for throttling the flow of the high-pressure refrigerant, and the high-pressure refrigerant is adiabatically expanded when it flows through the variable orifice.

The common valve element 24 is held by a first core 25 of the solenoid 13, which is disposed in a manner axially movable using the shaft 19 as a guide. The first core 25 operates as a movable core for actuating the common valve element 24. Below the first core 25 is disposed a second core 26 rigidly fitted on the shaft 19 for operating as a fixed core. The second core 26 is urged upward by a spring 27. The shaft 19 is urged by the spring 27 such that it is always in abutment with the power element. Further, a spring 28 is disposed between the first core 25 and the second core 26. When the solenoid is deenergized, the spring 28 urges the first core 25 in a direction in which the first core 25 moves away from the second core 26, whereby the common valve element 24 held by the first core 25 is always seated on the valve seat 18 to maintain a fully-closed state of the solenoid valve-equipped expansion valve 5. A solenoid coil 29 is disposed outside the core casing 22. When the solenoid coil 29 is energized, the first core 25 and the second core 26 are attracted to each other, whereby the common valve element 24 and the shaft 19 are electromagnetically coupled with each other to thereby transmit the displacement of the diaphragm 20 of the power element 12 to the common valve element 24.

It should be noted that so as to prevent internal leakage of refrigerant in which refrigerant leaks toward a downstream side of the valve portion through a gap between the common valve element 24 and the shaft 19 when the solenoid valve-equipped expansion valve 5 is closed, a V packing 30 is disposed in a space formed between the common valve element 24 and the first core 25.

In the solenoid valve-equipped expansion valve 5 constructed as above, when the rear-side air conditioning system is not used, the solenoid 13 is in a deenergized state. Therefore, the first core 25 is urged by the spring 28 in the direction in which it moves away from the second core 26, so that the common valve element 24 held by the first core 25 is seated on the valve seat 18. This causes the solenoid valve-equipped expansion valve 5 to function as the stop valve for blocking the refrigerant flow passage therein, which prevents refrigerant from flowing into the rear-side circuit.

Next, when the rear-side air conditioning system is used, the solenoid 13 is energized. This causes the first core 25 and the second core 26 to be attracted to each other and thereby being attached to each other, so that the common valve element 24 is indirectly fixed to the shaft 19. At this time, since the first core 25 is moved toward the second core 26, the common valve element 24 is moved away from the valve seat 18 to cause high-temperature and high-pressure refrigerant supplied from the condenser 2 to the port 14 to flow into the port 15 through the gap between the common valve element 24 and the valve seat 18. At this time, the high-temperature and high-pressure refrigerant is adiabatically expanded into low-temperature and low-pressure refrigerant, which is supplied from the port 15 to the rear evaporator 6.

The rear evaporator 6 causes the refrigerant supplied from the solenoid valve-equipped expansion valve 5 to exchange heat with air in the rear side of the compartment to thereby evaporate the refrigerant. The evaporated refrigerant is returned to the solenoid valve-equipped expansion valve 5. The expansion valve 5 receives the refrigerant returned from the rear evaporator 6, at the port 16, and the refrigerant is returned to the compressor 1 from the port 17. At this time, in the solenoid valve-equipped expansion valve 5, the temperature and pressure of the refrigerant delivered from the rear evaporator 6 are sensed by the diaphragm 20 of the power element 12, and the displacement of the diaphragm 20 dependent on the temperature and pressure of the refrigerant is transmitted to the common valve element 24 via the shaft 19 and the first and second cores 25, 26, to thereby control the flow rate of the refrigerant.

Although in the solenoid valve-equipped expansion valve 5 described above, the driving force-transmitting member for transmitting the driving force of the power element 12 to the valve portion is formed by one shaft 19, the member may be divided at a desired portion thereof such that the member is formed by two or more shafts.

Figure 3:
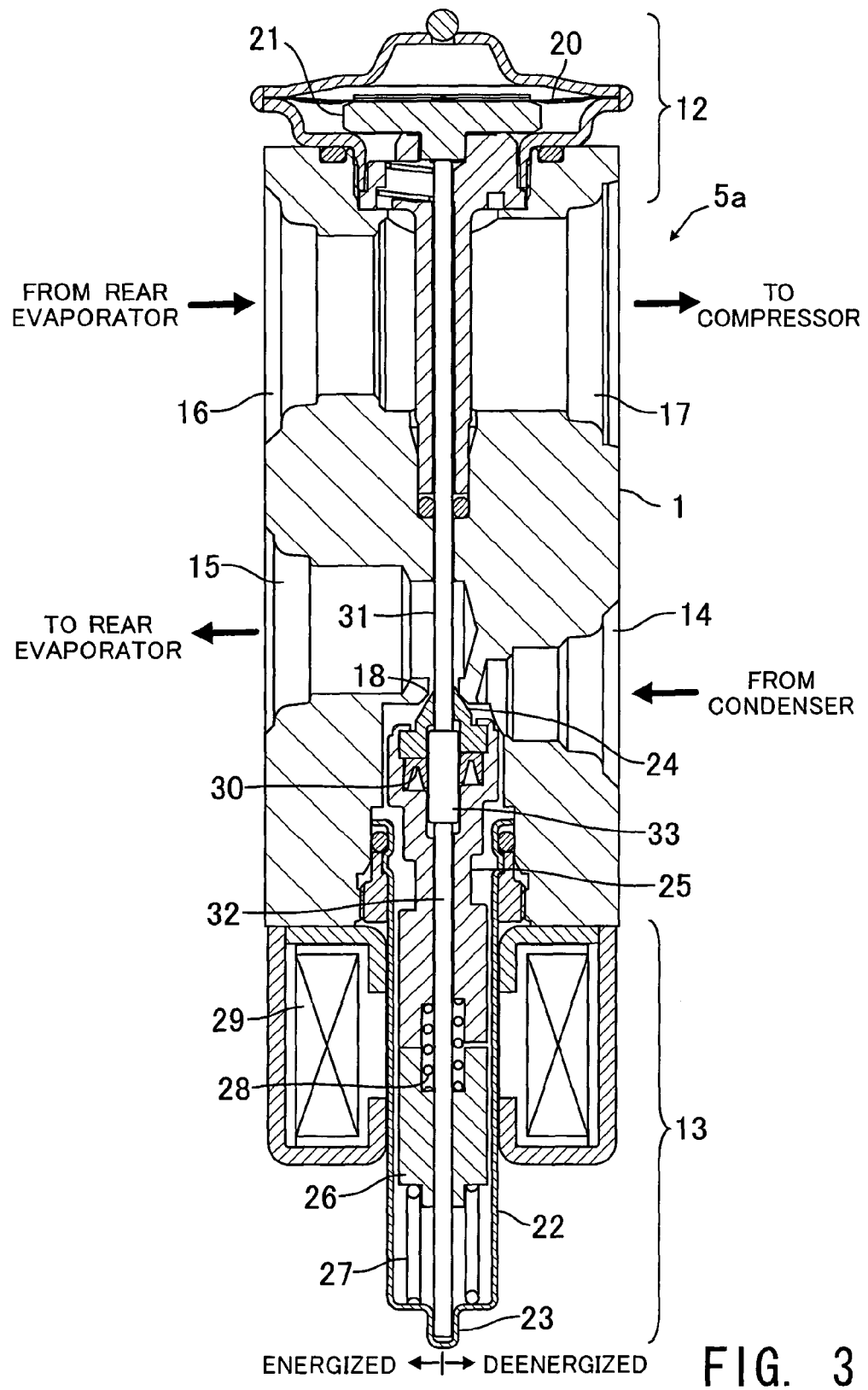
FIG. 3 is a longitudinal cross-sectional view showing an example of the construction of a solenoid valve-equipped expansion valve according to a second embodiment.

FIG. 3 is a longitudinal cross-sectional view showing an example of the construction of a solenoid valve-equipped expansion valve according to a second embodiment. It should be noted that in FIG. 3, component elements identical to or equivalent to those shown in FIG. 2 are designated by the same reference numerals, and detailed description thereof is omitted. Further, similarly to FIG. 2, in FIG. 3 as well, so as to simultaneously show a state in which the solenoid valve-equipped expansion valve is functioning as a stop valve for blocking a refrigerant flow passage, and a state in which the solenoid valve-equipped expansion valve is functioning as an ordinary expansion valve whose valve lift is controlled, as far as a valve element and a movable portion of a solenoid are concerned, a right side from the center of the figure shows a valve closed state of the valve in which the solenoid is deenergized, and a left side from the center of the figure shows a state of the same in which the solenoid is energized and the valve is functioning as an expansion valve.

The solenoid valve-equipped expansion valve 5a according to the second embodiment, when used as an expansion valve, has a predetermined electric current supplied to a solenoid 13 thereof, for operation of pulling a common valve element 24 thereof away from a valve seat 18 associated therewith. The solenoid valve-equipped expansion valve 5a is configured such that during this operation, operation of the common valve element 24 is not adversely affected by pressure of refrigerant supplied to a port 14.

More specifically, the driving force-transmitting member for transmitting the driving force of a power element 12 to a valve portion is formed by two shafts 31, 32, and a valve element guide 33. The shaft 31, the valve element guide 33, and the shaft 32 are arranged on the same axis in the mentioned order. The shaft 31 has an upper end thereof brought into abutment with a center disk 21 of the power element 12, and a lower end thereof configured to axially movably guide the common valve element 24. The valve element guide 33 has the same diameter as that of a valve hole and axially movably guides the common valve element 24. The shaft 32 forming a drive shaft of the solenoid 13 is urged by a spring 27 toward the power element 12. Further, a V packing 30 is disposed in a space formed between the common valve element 24 and a first core 25, whereby internal leakage of refrigerant is prevented in which when the solenoid valve-equipped expansion valve 5a is closed, high-pressure refrigerant introduced into the valve element guide 33 via a gap between the first core 25 and the shaft 32 flows toward a downstream side of the valve portion through a gap between the common valve element 24 and the valve element guide 33, and a gap between the common valve element 24 and a shaft 31.

Since the valve element guide 33 which guides the common valve element 24 and has the V packing 30 provided therefor has the same diameter as the inner diameter of the valve hole, an effective pressure-receiving area of a seating portion where the common valve element 24 is seated, and an effective pressure-receiving area of a portion of the common valve element 24 which slides along the valve element guide 33 gastightly due to the V packing are equal to each other, so that no force for urging the common valve element 24 in directions of opening and closing thereof is generated by the pressure of high-pressure refrigerant introduced from the port 14. Therefore, when the solenoid 13 is energized to attract the first core 25 and the second core 26 to each other, it is possible to pull the common valve element 24 away from the valve seat 18 only by a solenoid force. This means that only a small solenoid force is required for fixedly attaching the common valve element 24 to the driving force-transmitting member, and hence the solenoid 13 can be made compact in size.

It should be noted that the shafts 31, 32 and the valve element guide 33 may be formed as separate members, or integrally formed as a unitary member. Further, the shaft 32 disposed in the solenoid 13 may be configured to have the same diameter as that of the valve element guide 33 to thereby integrally form the shaft 32 and the valve element guide 33 as a unitary member.

Figure 4:
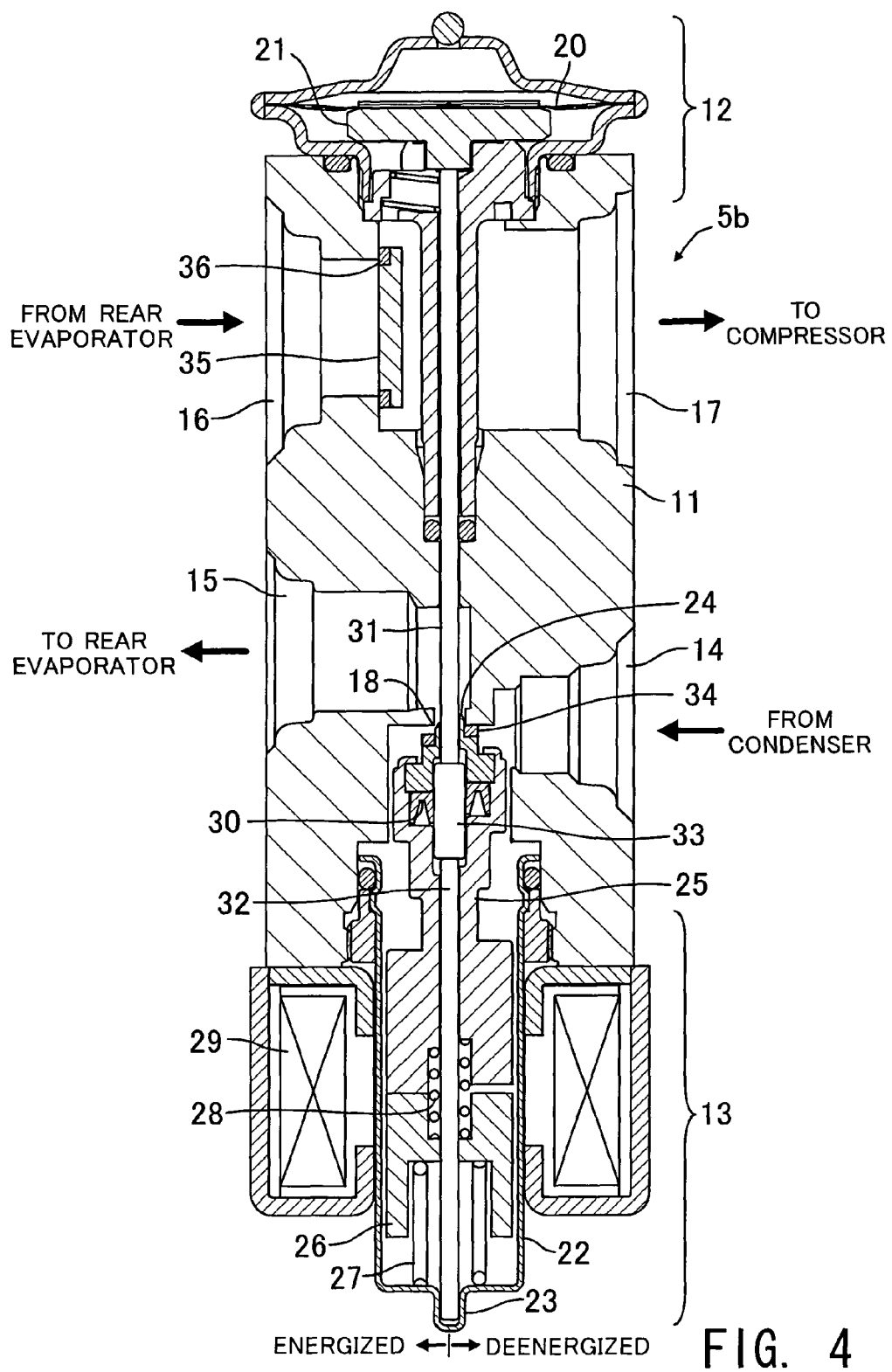
FIG. 4 is a longitudinal cross-sectional view showing an example of the construction of a solenoid valve-equipped expansion valve according to a third embodiment.

FIG. 4 is a longitudinal cross-sectional view showing an example of the construction of a solenoid valve-equipped expansion valve according to a third embodiment. It should be noted that in FIG. 4, component elements identical to or equivalent to those shown in FIG. 3 are designated by the same reference numerals, and detailed description thereof is omitted. Further, similarly to FIG. 2 and FIG. 3, in FIG. 4 as well, so as to simultaneously show a state in which the solenoid valve-equipped expansion valve is functioning as a stop valve for blocking a refrigerant flow passage, and a state in which the solenoid valve-equipped expansion valve is functioning as an ordinary expansion valve whose valve lift is controlled, as far as a valve element and a movable portion of a solenoid are concerned, a right side from the center of the figure shows a valve closed state of the expansion valve in which the solenoid is deenergized, and a left side from the center of the figure shows a state of the same in which the solenoid is energized and the valve is functioning as an expansion valve.

The solenoid valve-equipped expansion valve 5b according to the third embodiment is configured such that a function of completely stopping a flow of refrigerant and a function of preventing a reverse flow of refrigerant from the compressor 1 into the rear evaporator 6 are added to the function of the stop valve of the solenoid valve-equipped expansion valve 5a according to the second embodiment.

More specifically, a common valve element 24 has a flexible annular valve sheet 34 provided at a portion thereof via which it is seated on a valve seat 18. As a result, the valve sheet 34 completely seals between the common valve element 24 and the valve seat 18 when the solenoid valve-equipped expansion valve 5b is fully closed, whereby the flow of refrigerant can be completely stopped by the function of the stop valve for placing the solenoid valve-equipped expansion valve 5b in a fully closed state when the solenoid 13 is deenergized.

Further, a check valve 35 is disposed in a refrigerant passage between a port 16 for receiving refrigerant from the rear evaporator 6, and a port 17 for returning the refrigerant to the compressor 1. In the illustrated example, the check valve 35 is disposed on an outlet side of the refrigerant passage via which the refrigerant flows into a space communicating with a chamber under a diaphragm 20 so as to cause a power element 12 to sense the temperature and pressure of the refrigerant from the port 16. The check valve 35 is integrally formed with a leg portion, not shown, guided by an inner wall of the refrigerant passage in directions of opening and closing of the check valve 35, and at the same time urged by a spring, not shown, having a small spring force in the valve-closing direction. The check valve 35 has a flexible annular valve sheet 36 provided at a seating portion thereof via which it is seated on a valve seat associated therewith. As a result, when the solenoid 13 is deenergized, and the common valve element 24 is seated on the valve seat 18 to completely isolate the rear evaporator 6 from the condenser 2, the check valve 35 is capable of completely isolating the rear evaporator 6 also from the compressor 1. Therefore, when a rear-side circuit is made inoperative for a long time period, it is possible to prevent refrigerant on the compressor 1 side from flowing reversely into the rear evaporator 6 to be stagnant therein. This makes it possible to prevent refrigerant flowing through a front-side circuit from being decreased in amount to thereby maintain normal refrigerating operation.

Although in the above third embodiment, the valve sheet 34 is provided on the side of the common valve element 24, of course, it may be provided on the side of the valve seat 18. Further, the solenoid valve-equipped expansion valve according to the present invention is not intended to be applied to a refrigeration cycle using a particular refrigerant, but it can be applied to refrigeration cycles using every kind of refrigerant. Furthermore, although in the above first to third embodiments, descriptions have been given of cases in which the solenoid valve-equipped expansion valve according to the present invention is applied to the expansion valve of the rear-side air conditioning system, it is possible to apply the same to an expansion valve on a front-side air conditioning system arranged in a manner reverse to the FIG. 1 arrangement of the front-side and rear-side air conditioning systems. Further, it is also possible to configure the front-side air conditioning system and the rear-side air conditioning system such that they each have the same arrangement as that of the rear-side air conditioning system shown in FIG. 1, and apply the expansion valve according to the invention to expansion valves in both of the systems.

As described heretofore, according to the present invention, the common valve element in which the valve element of an expansion valve and the valve element of a stop valve are integrally formed as a unitary member is configured such that it can be coupled with or released from a driving force-transmitting member for transmitting the driving force of a power element to the common valve element, by a solenoid. This makes it possible to form a compact solenoid valve-equipped expansion valve in which the common valve element functions as a stop valve when the solenoid is deenergized, and functions as an expansion valve when the solenoid is energized.

Further, the stop valve is completely sealed by a valve sheet, and a check valve for preventing refrigerant from a compressor, from flowing reversely to a rear evaporator is provided in a refrigerant passage returning from the rear evaporator to the compressor. This makes it possible to completely isolate the rear evaporator from a refrigeration cycle, thereby preventing the amount of refrigerant used in refrigerating operation from being decreased due to stagnation of refrigerant in the rear evaporator.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A solenoid valve-equipped expansion valve in which an expansion valve for adiabatically expanding refrigerant and a stop valve for opening and closing a refrigerant passage are integrated with each other, characterized by comprising:

a driving force-transmitting member inserted into a valve hole of the expansion valve in an urged state such that the driving force-transmitting member is always in abutment with a power element;

a common valve element commonly used by the expansion valve and the stop valve, the common valve element being disposed on an opposite side of the valve hole of the expansion valve to the power element, such that the common valve element is axially movable by being guided by the driving force-transmitting member;

a spring for urging the common valve element in a valve-closing direction with respect to the driving force-transmitting member; and a solenoid for electromagnetically coupling the common valve element and the driving force-transmitting member with each other when the solenoid is energized, to thereby transmit displacement of the power element to the common valve element, wherein the solenoid includes a first core movable along the driving force-transmitting member while holding the common valve element, a second core rigidly fixed to the driving force-transmitting member, and a solenoid coil for causing attraction of the first core and the second core to each other or releasing of the first core and the second core from each other, and wherein the spring is interposed between the first core and the second core.

2. A solenoid valve-equipped expansion valve in which an expansion valve for adiabatically expanding refrigerant and a stop valve for opening and closing a refrigerant passage are integrated with each other, characterized by comprising:

a driving force-transmitting member inserted into a valve hole of the expansion valve in an urged state such that the driving force-transmitting member is always in abutment with a power element;

a common valve element commonly used by the expansion valve and the stop valve, the common valve element being disposed on an opposite side of the valve hole of the expansion valve to the power element, such that the common valve element is axially movable by being guided by the driving force-transmitting member;
a spring for urging the common valve element in a valve-closing direction with respect to the driving force-transmitting member; and
a solenoid for electromagnetically coupling the common valve element and the driving force-transmitting member with each other when the solenoid is energized, to thereby transmit displacement of the power element to the common valve element,
wherein the driving force-transmitting member comprises at least one shaft, and wherein a seal member is provided between the shaft and the common valve element.

\* \* \* \* \*